United States Patent
Dawson

[11] Patent Number: 6,164,239
[45] Date of Patent: Dec. 26, 2000

[54] LOCATION IDENTIFICATION BALLOON SYSTEM

[76] Inventor: Pearlene N. Dawson, 9006 Candelaria, NE., Albuquerque, N. Mex. 87112

[21] Appl. No.: 09/352,960

[22] Filed: Jul. 14, 1999

[51] Int. Cl.[7] .................................................. B64B 1/40
[52] U.S. Cl. ............... 116/210; 116/DIG. 8; 116/DIG. 9
[58] Field of Search ............................ 116/210, DIG. 8, 116/DIG. 9; 441/9, 30, 40, 41, 66, 93; 446/220, 221; 222/5

[56] References Cited

U.S. PATENT DOCUMENTS

| | | | |
|---|---|---|---|
| 2,613,849 | 10/1952 | Ward | 222/5 |
| 3,032,788 | 5/1962 | Lowther, Jr. | 222/5 |
| 3,727,229 | 4/1973 | Clinger et al. | 116/210 |
| 3,941,079 | 3/1976 | McNeil | 116/210 |
| 4,044,711 | 8/1977 | Jamison | 116/210 |
| 4,094,267 | 6/1978 | Davis, Jr. | 116/210 |
| 4,768,739 | 9/1988 | Schnee | 116/210 |
| 5,005,513 | 4/1991 | Van Patten et al. | 116/210 |
| 5,095,845 | 3/1992 | Murphy | 116/210 |
| 5,582,127 | 12/1996 | Willis et al. | 116/210 |

*Primary Examiner*—Andrew H. Hirshfeld
*Attorney, Agent, or Firm*—Joseph N. Breaux

[57] ABSTRACT

A location identification balloon system for use by lost or injured hikers and the like that includes a balloon filled with helium that is secured with a tether and allowed to float above the tree level to allow a search plane or helicopter to readily locate the missing person. Cause the balloon to provide a flickering effect, the balloon has a number of air capturing pockets that cause the balloon to spin in the wind. The balloon and tether are attached by a swivel to allow the balloon to spin freely. The balloon is filled by pulling on a spool driven compression mechanism to cause a compression plate to compress the sealed tip end of a pressurized helium canister over the piercing tube end of a valve.

1 Claim, 2 Drawing Sheets

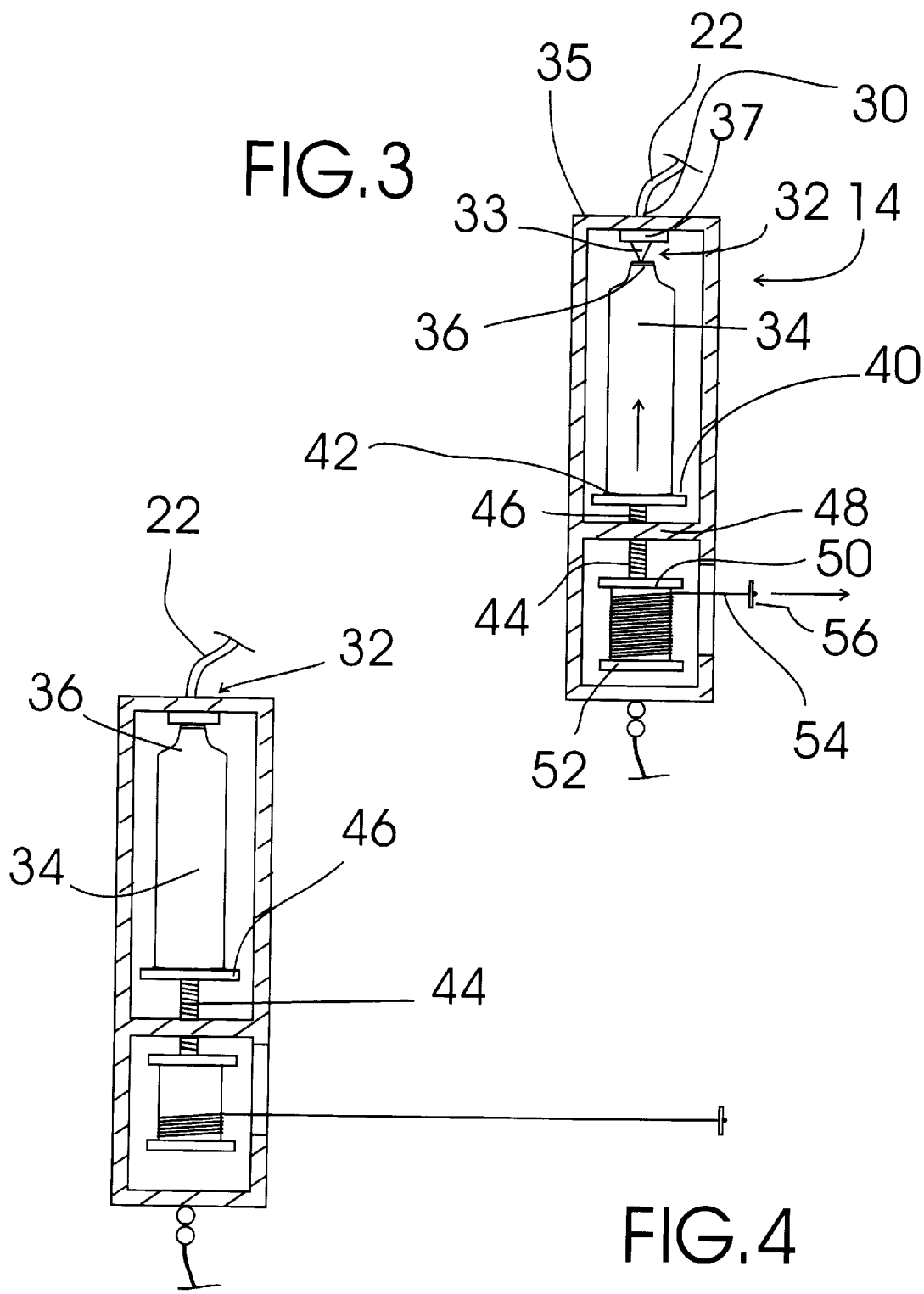

LOCATION IDENTIFICATION BALLOON SYSTEM

TECHNICAL FIELD

The present invention relates to emergency locating devices and systems and more particularly to a location identification balloon system that includes a helium balloon with multiple air capturing pockets; a pull string activated balloon inflation assembly having an output of a helium canister discharge valve in connection with a balloon fill tube of the helium balloon with multiple air pockets; a tether line; a swivel in connection between a top end of the tether line and a housing of the balloon inflation assembly; and a carry pack including a cavity sized to receive the helium balloon in a deflated condition, the balloon inflation assembly, the tether line, and the swivel therein, a snap closable cover structure and a belt attachment loop; the air capturing pockets being uniformly spaced around the circumference of an inflatable spherical helium balloon structure and having pocket openings facing in the same direction with respect to the circumference of the helium balloon; the pull string activated balloon inflation assembly having a housing enclosing a pressurized helium canister with a pierceable tip end, a helium canister discharge valve including an output in connection with the balloon fill tube and an inlet in connection with a tubular piercing element rigidly secured to the housing and having a sealing gasket provided therearound, a canister activation assembly including a compression plate in connection with a bottom surface of the helium canister, a threaded compression rod threaded through a rod support structure having a first end in connection with the compression plate and a second end in rigid connection with a drive spool, and a length of pull string wound onto the drive spool such that pulling on the pull string causes the drive spool to rotate in a direction causing the threaded compression rod and attached compression plate to drive the pierceable tip end of the helium canister onto and over the tubular piercing element of the helium canister discharge valve resulting in the pressurized contents of the helium canister discharging into and filling the helium balloon through the balloon fill tube.

BACKGROUND ART

It is often difficult to locate injured or missing hikers because ground cover prevents the searchers from easily searching large areas. It would be a benefit, therefore, to have a location identification balloon system that included a balloon filled with helium that could be secured with a tether and allowed to float above the tree level to allow a search plane or helicopter to readily locate the missing person. Because a flickering object can often be seen more easily, it would be a further benefit to have an a balloon inflatable with helium and having a number of air capturing pockets that cause the balloon to spin in the wind and provide a flashing effect.

GENERAL SUMMARY DISCUSSION OF INVENTION

It is thus an object of the invention to provide a location identification balloon system that includes a helium balloon with multiple air capturing pockets; a pull string activated balloon inflation assembly having an output of a helium canister discharge valve in connection with a balloon fill tube of the helium balloon with multiple air pockets; a tether line; a swivel in connection between a top end of the tether line and a housing of the balloon inflation assembly; and a carry pack including a cavity sized to receive the helium balloon in a deflated condition, the balloon inflation assembly, the tether line, and the swivel therein, a snap closable cover structure and a belt attachment loop; the air capturing pockets being uniformly spaced around the circumference of an inflatable spherical helium balloon structure and having pocket openings facing in the same direction with respect to the circumference of the helium balloon; the pull string activated balloon inflation assembly having a housing enclosing a pressurized helium canister with a pierceable tip end, a helium canister discharge valve including an output in connection with the balloon fill tube and an inlet in connection with a tubular piercing element rigidly secured to the housing and having a sealing gasket provided therearound, a canister activation assembly including a compression plate in connection with a bottom surface of the helium canister, a threaded compression rod threaded through a rod support structure having a first end in connection with the compression plate and a second end in rigid connection with a drive spool, and a length of pull string wound onto the drive spool such that pulling on the pull string causes the drive spool to rotate in a direction causing the threaded compression rod and attached compression plate to drive the pierceable tip end of the helium canister onto and over the tubular piercing element of the helium canister discharge valve resulting in the pressurized contents of the helium canister discharging into and filling the helium balloon through the balloon fill tube.

Accordingly, a location identification balloon system is provided. The location identification balloon system includes a helium balloon with multiple air capturing pockets; a pull string activated balloon inflation assembly having an output of a helium canister discharge valve in connection with a balloon fill tube of the helium balloon with multiple air pockets; a tether line; a swivel in connection between a top end of the tether line and a housing of the balloon inflation assembly; and a carry pack including a cavity sized to receive the helium balloon in a deflated condition, the balloon inflation assembly, the tether line, and the swivel therein, a snap closable cover structure and a belt attachment loop; the air capturing pockets being uniformly spaced around the circumference of an inflatable spherical helium balloon structure and having pocket openings facing in the same direction with respect to the circumference of the helium balloon; the pull string activated balloon inflation assembly having a housing enclosing a pressurized helium canister with a pierceable tip end, a helium canister discharge valve including an output in connection with the balloon fill tube and an inlet in connection with a tubular piercing element rigidly secured to the housing and having a sealing gasket provided therearound, a canister activation assembly including a compression plate in connection with a bottom surface of the helium canister, a threaded compression rod threaded through a rod support structure having a first end in connection with the compression plate and a second end in rigid connection with a drive spool, and a length of pull string wound onto the drive spool such that pulling on the pull string causes the drive spool to rotate in a direction causing the threaded compression rod and attached compression plate to drive the pierceable tip end of the helium canister onto and over the tubular piercing element of the helium canister discharge valve resulting in the pressurized contents of the helium canister discharging into and filling the helium balloon through the balloon fill tube.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 3 is a cutaway view of the pull string activated balloon inflation assembly in the non-discharged state showing the pressurized helium canister within the housing; the pierceable tip end of the helium canister against the tubular piercing element of the helium canister discharge valve; the output of the helium canister discharge valve in connection with the balloon fill tube; and the canister activation assembly including the compression plate in connection with a bottom surface of the helium canister, the threaded compression rod threaded through the rod support structure and having a first end in connection with the compression plate and a second end in rigid connection with the drive spool, and the length of pull string wound onto the drive spool.

FIG. 4 is a cutaway view of the pull string activated balloon inflation assembly after the pull string is pulled with the pierceable tip end of the helium canister driven onto and over the tubular piercing element of the helium canister discharge valve.

EXEMPLARY MODE FOR CARRYING OUT THE INVENTION

Figures 1, 2:
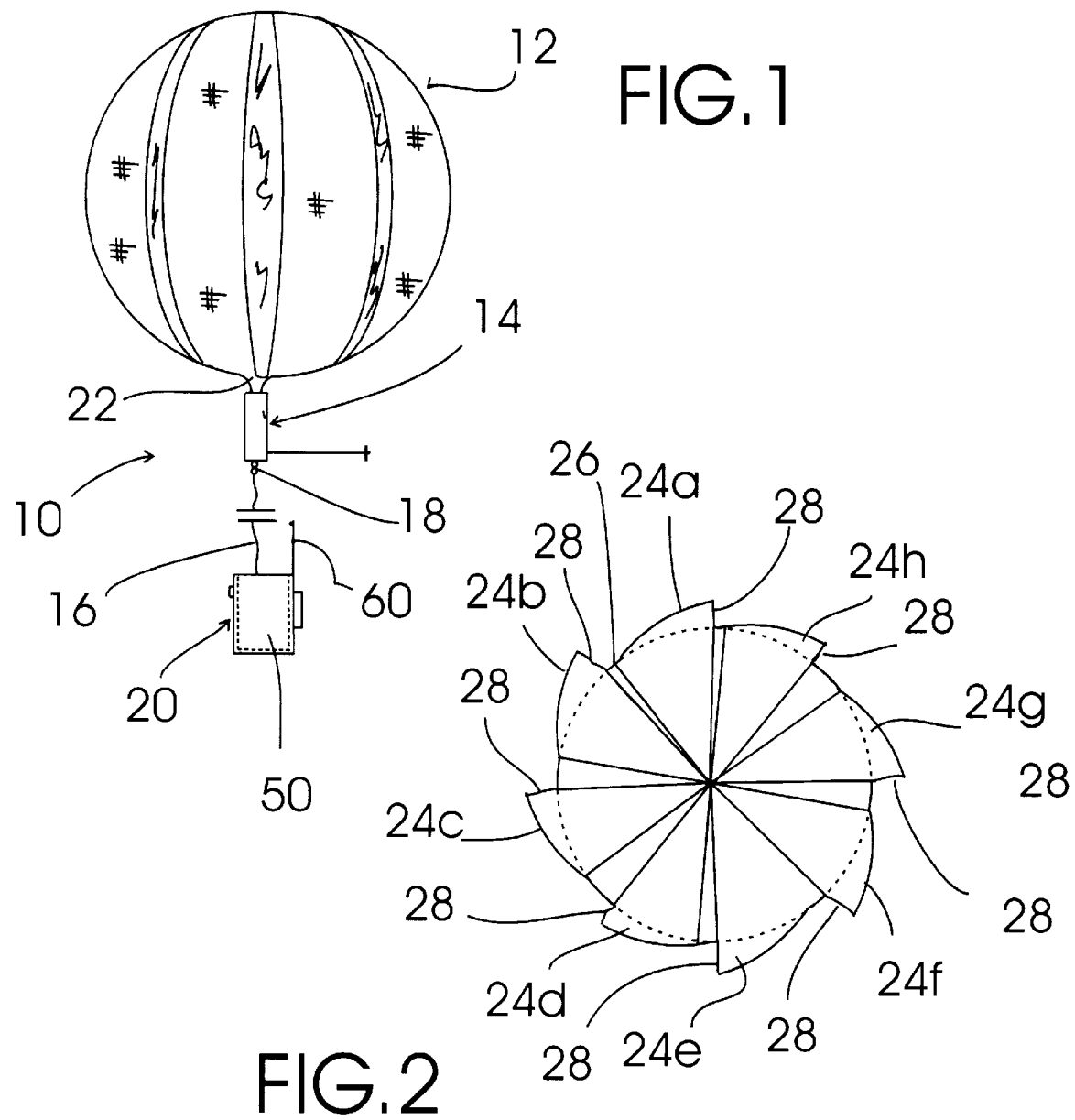
FIG. 1 is a side plan view of an exemplary embodiment of the location identification balloon system of the present invention showing the helium balloon with multiple air capturing pockets; the pull string activated balloon inflation assembly having an output of a helium canister discharge valve in connection with a balloon fill tube of the helium balloon with multiple air pockets; the tether line; the swivel in connection between a top end of the tether line and a housing of the balloon inflation assembly; and a carry pack including a cavity sized to receive the helium balloon in a deflated condition, the balloon inflation assembly, the tether line, and the swivel therein, a snap closable cover structure and a belt attachment loop; the air capturing pockets being uniformly spaced around the circumference of an inflatable spherical helium balloon structure and having pocket openings facing in the same direction with respect to the circumference of the helium balloon; the pull string activated balloon inflation assembly having a housing enclosing a pressurized helium canister with a pierceable tip end, a helium canister discharge valve including an output in connection with the balloon fill tube and an inlet in connection with a tubular piercing element rigidly secured to the housing and having a sealing gasket provided therearound, a canister activation assembly including a compression plate in connection with a bottom surface of the helium canister, a threaded compression rod threaded through a rod support structure having a first end in connection with the compression plate and a second end in rigid connection with a drive spool, and a length of pull string wound onto the drive spool such that pulling on the pull string causes the drive spool to rotate in a direction causing the threaded compression rod and attached compression plate to drive the pierceable tip end of the helium canister onto and over the tubular piercing element of the helium canister discharge valve resulting in the pressurized contents of the helium canister discharging into and filling the helium balloon through the balloon fill tube.
FIG. 2 is a top plan view of the helium balloon with multiple air pockets of FIG. 1 showing the eight air capturing pockets uniformly spaced around the circumference of the inflatable spherical helium balloon structure and eight pocket openings facing in the same direction with respect to the circumference of the helium balloon.

FIG. 1 is a side plan view of an exemplary embodiment of the location identification balloon system of the present invention generally designated 10. Location identification balloon system 10 includes a helium balloon with multiple air capturing pockets, generally designated 12; a pull string activated balloon inflation assembly, generally designated 14; a two-hundred foot long tether line 16; a swivel 18; and a carry pack, generally designated 20.

Helium balloon with multiple air capturing pockets 12 is constructed of multiple colored, reflective mylar material and includes, referring now to FIG. 2, eight air capturing pockets 24a–h uniformly spaced around the circumference of an inflatable spherical helium balloon structure 26 and having pocket openings 28 facing in the same direction with respect to the circumference of helium balloon structure 26. Helium balloon structure 26 is fillable through a balloon fill tube 22 (FIG. 1).

Referring now to FIG. 3, pull string activated balloon inflation assembly 14 has the output tube 30 of a helium canister discharge valve, generally designated 32, in connection with balloon fill tube 22 of helium balloon structure 26 (FIG. 2) and an inlet in connection with a tubular piercing element 33 rigidly secured to a rigid housing 35 and having a sealing gasket 37 provided therearound; a pressurized helium canister 34 with a pierceable tip end 36 within housing 35; a canister activation assembly, generally designated 38, including a compression plate 40 in connection with a bottom surface 42 of helium canister 34, a threaded compression rod 44 threaded through a rod support structure 46 having a first end 48 in connection with compression plate 40 and a second end 50 in rigid connection with a drive spool 52; and a length of pull string 54 wound onto drive spool 52 such that pulling on pull string 54 with handle 56 causes drive spool 52 to rotate in a direction causing, with reference to FIG. 4, threaded compression rod and attached compression plate 46 to drive pierceable tip end 36 of helium canister onto and over the tubular piercing element 33 of helium canister discharge valve 32 resulting in the pressurized contents of helium canister 34 discharging into and filling helium balloon structure 26 (FIG. 2) through the balloon fill tube 22.

Referring back to FIG. 1, carry pack 20 includes a cavity 50 (Shown in dashed lines) sized to simultaneously receive the helium balloon with multiple air pockets 12 in a deflated condition, balloon inflation assembly 14, tether line 16 and swivel 18 therein; a snap closable cover structure 60 for covering and sealing cavity 50; and a belt attachment loop 62.

It can be seen from the preceding description that a location identification balloon system has been provided that includes a helium balloon with multiple air capturing pockets; a pull string activated balloon inflation assembly having an output of a helium canister discharge valve in connection with a balloon fill tube of the helium balloon with multiple air pockets; a tether line; a swivel in connection between a top end of the tether line and a housing of the balloon inflation assembly; and a carry pack including a cavity sized to receive the helium balloon in a deflated condition, the balloon inflation assembly, the tether line, and the swivel therein, a snap closable cover structure and a belt attachment loop; the air capturing pockets being uniformly spaced around the circumference of an inflatable spherical helium balloon structure and having pocket openings facing in the same direction with respect to the circumference of the helium balloon; the pull string activated balloon inflation assembly having a housing enclosing a pressurized helium canister with a pierceable tip end, a helium canister discharge valve including an output in connection with the balloon fill tube and an inlet in connection with a tubular piercing element rigidly secured to the housing and having a sealing gasket provided therearound, a canister activation assembly including a compression plate in connection with a bottom surface of the helium canister, a threaded compression rod threaded through a rod support structure having a first end in connection with the compression plate and a second end in rigid connection with a drive spool, and a length of pull string wound onto the drive spool such that pulling on the pull string causes the drive spool to rotate in a direction causing the threaded compression rod and attached compression plate to drive the pierceable tip end of the helium canister onto and over the tubular piercing element of the helium canister discharge valve resulting in the pressurized contents of the helium canister discharging into and filling the helium balloon through the balloon fill tube.

It is noted that the embodiment of the location identification balloon system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A location identification balloon system comprising:

a helium balloon with multiple air capturing pockets;

a pull string activated balloon inflation assembly in connection with a balloon fill tube of said helium balloon with multiple air pockets;

a tether line;

a swivel in connection between a top end of said tether line and a housing of said balloon inflation assembly; and a carry pack including a cavity sized to receive said helium balloon in a deflated condition, said balloon inflation assembly, said tether line, and said swivel therein, said carry pack including a snap closable cover structure and a belt attachment loop;

said air capturing pockets being uniformly spaced around an outer circumference of said helium balloon;

said housing of said pull string activated balloon inflation assembly enclosing a pressurized helium canister with a pierceable tip end, a helium canister discharge valve including an output in connection with said balloon fill tube and an inlet having a tubular piercing element rigidly secured to said housing and having a sealing gasket provided therearound, a canister activation assembly including a compression plate in connection with a bottom surface of said helium canister, a threaded compression rod threaded through a rod support structure having a first end in connection with said compression plate and a second end in rigid connection with a drive spool, and a length of pull string wound onto said drive spool such that pulling on said pull string causes said drive spool to rotate in a direction causing said threaded compression rod and attached compression plate to drive said pierceable tip end of said helium canister onto and over said tubular piercing element of said helium canister discharge valve resulting in pressurized helium from said helium canister discharging into and filling said helium balloon through said balloon fill tube.

* * * * *